July 16, 1940.   F. A. PARSONS   2,208,340
TRANSMISSION AND CONTROL MECHANISM
Filed Sept. 25, 1936   3 Sheets-Sheet 1
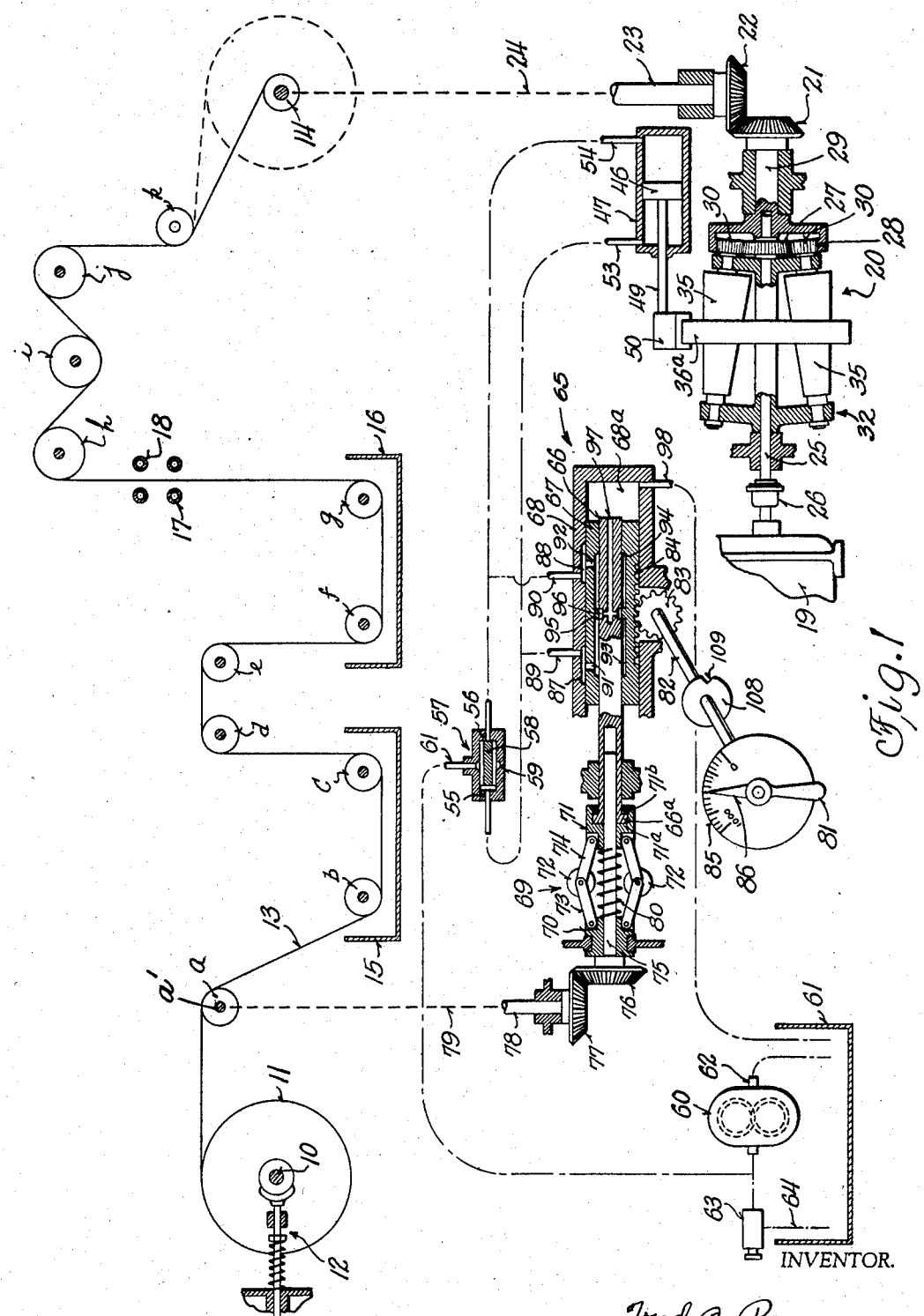
INVENTOR.
BY  Fred A. Parsons
ATTORNEY.

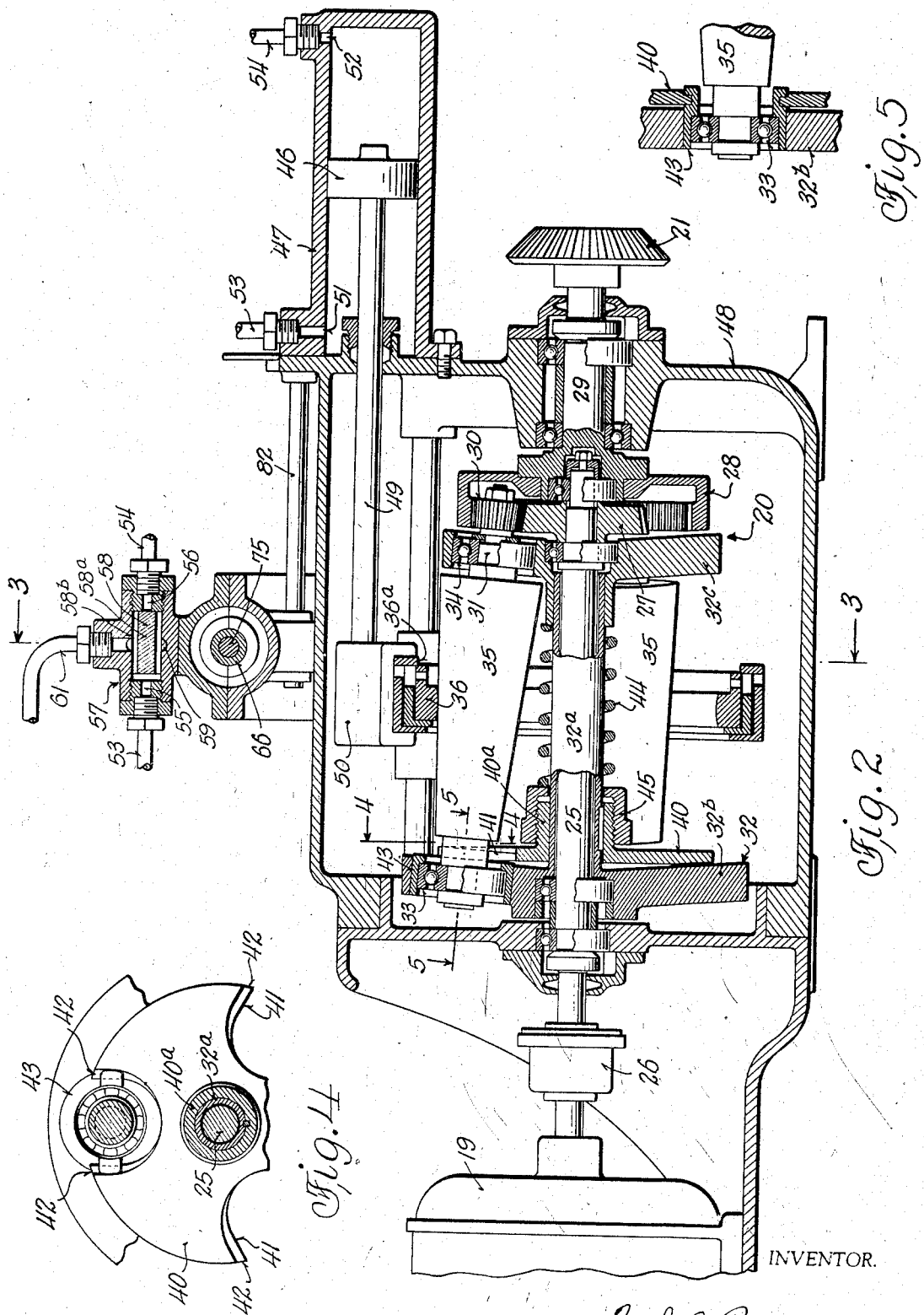

July 16, 1940.  F. A. PARSONS  2,208,340
TRANSMISSION AND CONTROL MECHANISM
Filed Sept. 25, 1936  3 Sheets-Sheet 3
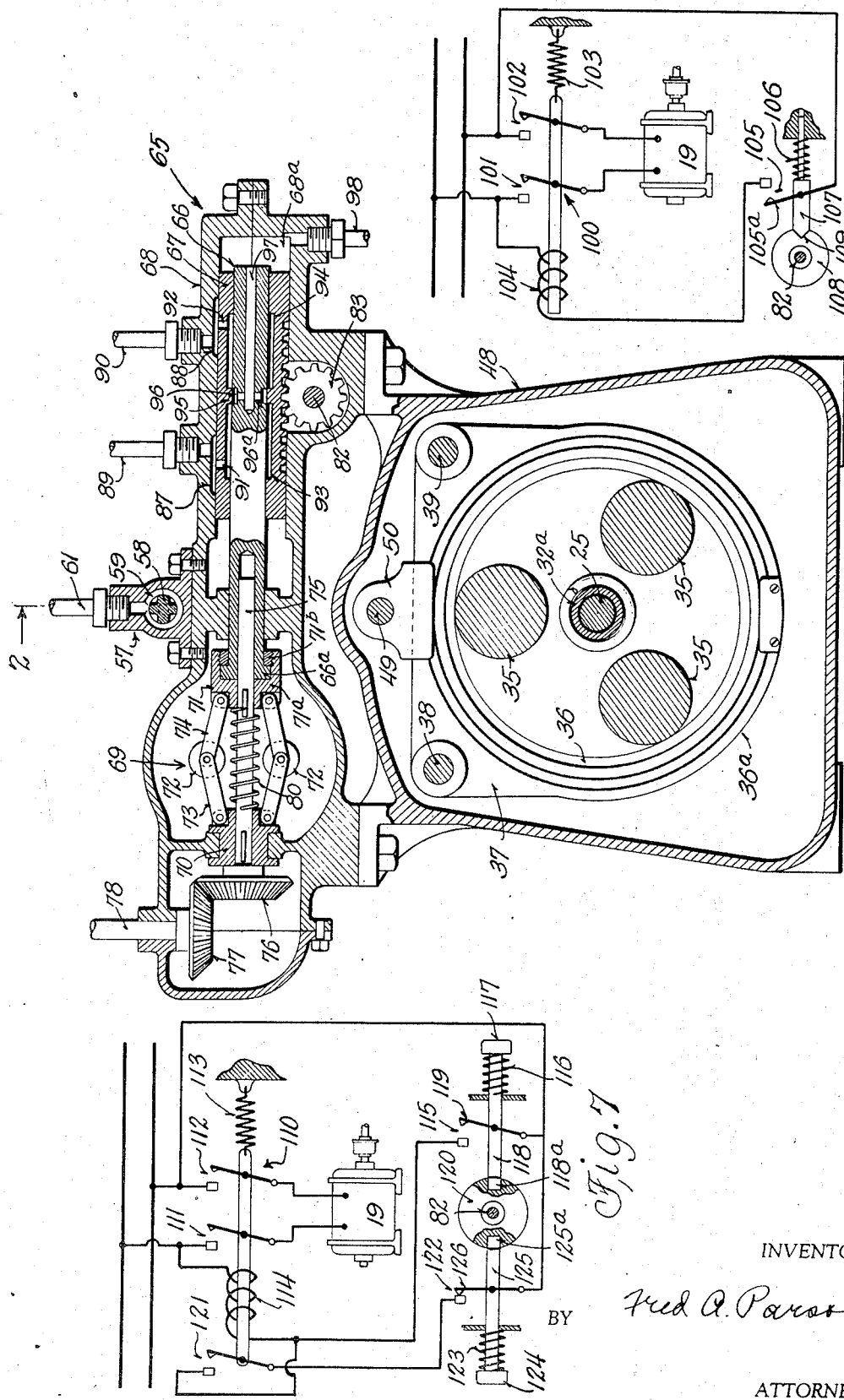
INVENTOR.
Fred A. Parsons
BY
ATTORNEY.

Patented July 16, 1940

2,208,340

UNITED STATES PATENT OFFICE 2,208,340

TRANSMISSION AND CONTROL MECHANISM

Fred A. Parsons, Milwaukee, Wis., assignor to The Falk Corporation, Milwaukee, Wis., a corporation of Wisconsin Application September 25, 1936, Serial No. 102,489

16 Claims. (Cl. 242—75)

This invention relates to transmission and control mechanism and especially for operating on paper or fabric or the like where the material is wound on rolls or mandrels, and has particular application where it is desired to select and maintain a desired linear speed of the material being operated upon, irrespective of the changing diameter of the roll of material.

As an instance of the use of the invention in the winding of thin or flexible material such for example as paper onto mandrels, the material must be kept under tension as it is wound on a roll of increasing diameter. This may be done by applying the winding power to the mandrel in which case, unless prevented, the increasing roll diameter imparts progressively increasing linear speed to the material as the roll diameter increases. A purpose of the invention is to maintain a constant linear speed of the material, preferably the maximum speed which the nature of the material, or of an operation being performed thereon, will permit.

A further purpose of the invention is to provide an improved variable speed transmission mechanism for winding rolls, together wtih speed selective control mechanism for the choice of a preferred linear speed of the material being wound.

A further purpose is to provide an improved automatic speed control mechanism which will control the speed of the transmission in a manner to maintain a constant linear speed of material being operated upon, irrespective of any tendency of certain elements of the machine to alter the speed of the material.

A further purpose is to provide an improved rate change device for some of the purposes previously mentioned in an improved strictly mechanical form, as distinguished from electrical or hydraulic devices, and an improved control mechanism therefor.

A further purpose is to generally simplify and improve the construction and operation of transmission and control mechanism, particularly for maintaining a constant linear speed of material being operated upon.

The invention embraces the construction and relationship of parts as herein illustrated, described and claimed, together with such modifications thereof as are within the scope of the claims.

The same reference characters have been used for the same parts throughout, and in the drawings:

Figure 1 is a semi-diagrammatic development of a machine for unwinding, treating and rewinding a web of paper, and which incorporates the invention.

Figure 2 is a partial vertical section through a unit incorporating certain transmission and control mechanism shown in Fig. 1 taken along line 2—2 of Fig. 3.

Figure 3 is a transverse vertical section through the same unit, taken along line 3—3 of Fig. 2.

Figures 4 and 5 are partial sections taken approximately along lines 4—4 and 5—5 of Fig. 2.

Figure 6 is a diagram showing the controls for starting and stopping a motor of the machine, and an interlock between such controls and a rate changer controller.

Figure 7 is a diagram showing an alternative form of interlocked motor and rate changer controllers.

The machine shown in Fig. 1 includes a mandrel 10 upon which is carried a roll of material 11, the material in this instance being paper. A friction brake generally indicated by the numeral 12 operates to set up a drag on the roll 11, whereby to maintain a desired tension on the traveling paper web 13. The paper is rewound on a mandrel 14 and in the course of its movement to mandrel 14 passes various rolls, the rolls a, b, c, d, guiding the paper through a tank 15, in this instance containing melted paraffin, the rolls e, f, g, h, guiding the paper through a tank 16, in this instance containing water. Adjacent to the surfaces of the vertical web of paper between rolls g, h are vacuum scraper tubes 17, 18 for removal of surplus material from the paper. The rolls h, i, j, in this instance are glazing rolls, and from them the paper is guided by roll k to be wound on the mandrel 14.

Mandrel 14 is driven through a transmission which includes a suitable power source, such as a motor 19, a rate changer generally indicated by the numeral 20, gearing including bevel gears 21, 22 and a train including a shaft 23. The remainder of the connecting train to mandrel 14 may be of any suitable well known form and is, therefore merely diagrammatically indicated by the dotted line 24 connecting shaft 23 to the winding mandrel.

The rate changer 20, as here shown, is of a form disclosed in the co-pending application Serial No. 52,095, filed November 29, 1935, and will therefore here be only briefly described. The rate changer includes a drive shaft 25 driven from motor 19 through a coupling 26, which may be of any well known form, a driving gear 27 fixed on the drive shaft, a driving gear 28 fixed in a driven shaft 29, which is co-axial with shaft 25, and gears such as 30 fixed on shafts such as 31, there being several of the gears 30, preferably three, equi-angularly spaced and each simultaneously engaging the driving gear 27 and driven gear 28. Shafts 31 are each journaled in a cage, generally denoted by the numeral 32, supported for independent rotation co-axial with drive shaft 25, the cage including a sleeve portion 32a and flange portions 32b and 32c fixed with sleeve 32a and respectively carrying the bearings for the opposite ends of shafts 31, in this instance anti-friction bearings such as 33, 34.

Fixed for rotation with each of shafts 31 are conically tapered friction rolls such as 35, the axis of shafts 31 being angularly disposed with respect to the axis of drive shaft 25, at an angle such that the outer periphery of each of the conical rolls is parallel with the axis of drive shaft 25. Frictionally simultaneously engaging the peripheries of each of the rolls 35 there is a friction ring 36 carried by a frame generally denoted by the numeral 37, the frame together with the ring 36 being adjustable in a path parallel with the axis of drive shaft 25, whereby to engage ring 36 with the rolls 35 at points of different roll diameter, the frame being slidably guided for such movement on spaced guide members or rods 38, 39, to be shifted by means later described. Ring 36 is prevented from rotation and carried by frame 37 in a mounting 36a in a manner permitting of a certain amount of adjustment relative to the frame whereby to simultaneously engage the periphery of each of the friction rolls 35 with equal pressure and at corresponding roll diameters, but since the details of the ring mounting do not concern the present invention they will not be here described.

The friction contact between the rolls 35 and ring 36 forces each roll to revolve whenever cage 32 is revolved and at a relative speed determined in part by the diameter of rolls 35 at the point of ring contact. As the ring 36 is axially shifted it contacts rolls 35 at points of differing roll diameter and changes the relative speed of the rolls. Thus as the ring is adjusted to the left in Fig. 2 the speed of the rolls 35 and of the gears 30 increases, and vice versa, and the relationship is such that when shaft 25 is driven at a constant speed the variable speed of rolls 35 will enforce a variable speed on driven shaft 29. With the parts proportioned as shown in Figs. 2, 3, the speed of driven shaft 29 may be any speed from zero speed, obtained when ring 36 is nearly in its farthest position to the left, to a maximum speed which is about one-fourth the speed of drive shaft 25, but various other ranges of the speed of driven shaft 29 may be readily obtained by the use of gearing and rolls differently proportioned to suit the desired speed range, and in any event any speed within a selected predetermined range may be obtained by adjustments of ring 36 to positions intermediate the zero speed and maximum speed positions.

With the rate changer 20, constructed with parts proportioned as here shown, the ring 36 may be shifted to the left past the zero speed position and then effects a reversal of driven shaft 29, for purposes later explained.

Means are provided to maintain suitable friction pressures between the rolls 35 and ring 36. For this purpose the bearings are mounted to be axially slidable along their axes, together with rolls 35. Each of the rolls is continuously urged to the left in Fig. 2 by the means of a yoke 40 slotted as at 41 to provide ears such as 42 engaging a sleeve, such as 43, which carries bearings 33, the yoke 40 being continuously urged to the left in Fig. 2, together with sleeve 43, bearings 33 and rolls 35, by the means of a spring 44, the spring pressure being adjustable by the means of a spring abutment member 45 threaded on the hub 40a of yoke 40. Forcing the rolls 35 to the left maintains friction pressure between the roll periphery and the friction ring 36 by reason of the angular relationship of the axes of shafts 31.

Power means are provided for shifting the friction ring 36 as follows: A piston 46 operates in a cylinder 47 fixed with the housing 48 of the rate changer 20, and has a piston rod 49 extended within the housing and carrying a shifter fork 50 engaging the sides of ring mounting 36a. Cylinder 47 provides ports 51, 52 respectively at opposite ends and supplied with fluid from channel pipe connections 53, 54 respectively communicating with the ports 55, 56 of a valve generally denoted by the numeral 57. Valve 57 includes a plunger member 58 having a central core portion 58a and movable in either direction for the core to cover and close either port 55, 56, the valve having a central annular port 59 communicating with grooves such as 58b which permits fluid to pass to the ends of the member 58 and to the ports 55, 56, except when the member 58 has moved to cover the one or the other port, the port 59 being continuously supplied with pressure fluid from a pump 60, through a pipe channel 61. Pump 60 may be of any suitable type, preferably driven at constant speed from motor 19 through a suitable train, not shown.

Pump 60 draws fluid from a reservoir such as 61, the reservoir preferably being formed by the lower portion of housing 48, through a pipe connection 62, and delivers fluid to the pipe connection 61 through a pressure controlling relief valve 63, of any suitable well known form, which passes excess fluid back to the reservoir through a channel 64.

Control means are provided to determine the operative connection of pump 60 and piston 46, including a control valve generally denoted by the numeral 65 and comprising an inner shiftable member 66, an outer shiftable member 67, and a housing 68.

Inner valve member 66 is longitudinally shiftable from a speed responsive device generally denoted by the numeral 69, which includes a rotatable, axially stationary member 70, a rotatable axially shiftable member 71, weights 72, 72 each carried on arms such as 73, 74, pivoted at the one end with the weight and at the other end respectively pivoted with the members 70, 71. The weights 72, 72 together with the members 70, 71 are rotated at a speed corresponding to the linear speed of the paper web by the means of a shaft 75, bevel gears 76, 77, a shaft 78 and a train of any suitable form diagrammatically indicated at 79, Fig. 1, connecting shaft 79 to the shaft of one of the rolls over which the web 13 passes, as for instance the shaft a' of the roll a. The member 71 is connected for axial shifting of valve member 66 by a coupling which includes the enlarged end 66a of the valve member and abutting portions 71a, 71b of the member 71. During rotation of weights 72, 72 the weights tend to fly outwardly by centrifugal force, such tendency being opposed by a spring 80 abutting members 70, 71 at its opposite ends. The arrangement provides that the speed responsive device is driven serially through rate changer 20 and through other means, in this instance the variable diameter paper roll on mandrel 14, and paper web 13, which may have various speeds in each speed position of the rate changer. The result of the arrangement described is that valve member 66 is automatically positioned longitudinally in accordance with the linear speed of the paper web 13, irrespective of the position of adjustment of the rate changer.

The outer valve member 67 may be longitudinally shifted independently of valve member 66 by the means of a hand lever 81 fixed on a shaft 82, upon which is fixed a gear 83, the position of adjustment of the member 67 being visibly indicated by a graduated chart 85 against which a pointer 86, movable from handle 81, is readable.

The valve casing 68 provides ports 87, 88 respectively communicating with the supply pipe channels 53, 54 of piston 46 through pipe channels 89, 90, the ports being elongated to communicate with ports 91, 92 of the outer valve member 67 in any longitudinal position of the valve member. Ports 91, 92 respectively supply annular grooves 93, 94 in the valve member 67, the annular grooves being separated by a partition portion 95. Valve member 66 provides transverse port openings such as 96, communicating with a drain bore 97 which drains to the end chamber 68a of the valve casing 68 and thence through a drain pipe 98 to reservoir 61.

In any position of the outer valve member 67, as determined by hand lever 81, there is one position of valve member 66 where the ports 96 are covered by the partition 95, whereby no fluid can pass from either annular groove 93, 94 to the drain 97. But when the valve members 66, 67 are relatively displaced from that position pressure fluid will leak past the partition 95 to the drain from the one or the other pipe channels 53, 54 through the connecting pipe channels 89 or 90 and through the annular grooves 93 or 94, which continuously communicate with the channels 89, 90 through the ports and channels described.

The valve member 66 has various longitudinal positions according to the linear speed of the paper web, as described, but in each of these positions, if valve member 67 is suitably correspondingly positioned no fluid will drain from either pipe channel 53 or 54. The graduations on chart 85 are arranged to indicate such positions of the valve member 67 as will prevent drain of fluid in the various speed posititons of valve member 66, and are preferably provided with numerical indices (not shown) to indicate the corresponding linear speed of the paper web.

If the relative positions of valve members 66, 67 is such as to permit drain of fluid from either pipe channel 53, 54, such leakage operates to automatically cause piston 46 to operate to shift the ring 36 in the direction to raise or lower the speed of the paper web, whichever may be necessary to position valve member 66 in a position preventing such leakage. An explanation of the operation of the device will illustrate the effect just mentioned, as follows:

At the start of a winding operation the paper web will be stationary, the paper roll on mandrel 14 of minimum diameter, the indicator 86 set at zero speed, and the inner valve member 66 in the position determined by the zero speed of the speed responsive device 69. Since both valve members 66, 67 are in zero speed position the partition 95 closes leakage port 96 and no leakage then occurs through channels 97, 98 from either end of piston 46, the piston then being held rigidly in the position effecting zero speed of the rate changer 20, namely, with the speed control ring 36 in its left hand position in Figs. 1, 2.

To start rotation of winding mandrel 14, the speed indicator 86 is shifted in the direction of the desired speed, in this instance in a direction to shift valve member 67 to the left in Figs. 1, 3. The port 96 leading to drain 97 is then no longer covered by the partition 95, which is displaced to the left, and fluid drains from the right end of piston 46 through pipe channels 54, 90, ports 88, 92, annular groove 94, drain port 96 and channels 96a, 97, 98 to return to reservoir 61. Immediately such leakage starts the flow of fluid, in the direction of the drain through port 96 of valve 57, shifts valve plunger 58 in a direction to cover the port 56, thereby establishing fluid pressure against the left end of piston 46 through port 55 of valve 57 and through the pipe channel 53. Since the right end of the piston 46 continues connected to the drain, the piston 46 starts movement to the right, thereby shifting speed control ring 36 to the right and starting rotation of the mandrel 14 and linear motion of the paper web 13, and also starting rotation of the speed responsive device 69 and a shifting of valve member 66 in the same direction in which valve member 67 previously was moved. Such movement of speed control ring 36 continues to increase the speed of mandrel 14, paper web 13 and speed responsive device 69 until valve member 66 occupies a position corresponding to valve 67, at which time the linear speed of the paper web corresponds to the position of pointer 86 against chart 85, and the drain port 96 is again covered by the partition 95, preventing further leakage. There then being no escape for the fluid at the right end of piston 46, the piston is rigidly retained in its position by the fluid pressure on the left side acting against the trapped fluid on the right side.

But as the diameter of the paper roll on mandrel 14 increases, such increase raises the speed of the paper web 13 and of the speed responsive device 69, thereby shifting valve member 66 to the left. Such movement displaces drain port 96 until it is no longer covered by partition 95, and leakage starts from the left end of piston 46 through pipe channels 53, 89, ports 87, 91, annular groove 93 drain port 96 and drain channels 96a, 97, 98, the valve 57 then acting in a manner similar to that previously described but in this instance to establish pressure on the right end of piston 46 to shift speed control ring 36 to the left until the speed of mandrel 14 and paper web 13 is reducede sufficiently to again shift valve member 66 to the right, to a position where drain port 96 is again covered by partition 95, such operation continuing during the entire winding of the paper roll on mandrel 14, and operating to maintain the linear speed of the paper web 13 substantially constant, at the speed determined by the sitting of pointer 86, during the entire winding process.

At the completion of the winding operation the pointer 81 manually returned to zero speed position, and the resulting displacement of valve members 66, 67 causes leakage in the manner described to correspondingly reduce the speed of rate changer 20 and winding mandrel 14 to zero speed.

From the foregoing description it will be apparent that the linear winding speed of web 13 may be established and maintained at any desired speed within the range of the machine, which may of course be altered to suit desired requirements, by suitably proportioning the parts, particularly the parts affecting the speed range of rate changer 20 and of speed responsive device 69.

In machines for certain purposes it may be desirable to provide for reversal of rate changer 20. Thus in the present machine it is desirable at times to reverse the rotation of mandrel 14, as for setting up the machine, or for unwinding defective portions of rolled material. The control mechanism shown provides for such reversal. Rate changer 20 being reversible as previously explained, by the shifting of friction ring 36 to the left, past the zero speed position, the reverse rotation will be readily effected by shifting the pointer 86 somewhat past the zero speed position, thereby effecting leakage such as previously explained, which will continue the movement of piston 46 and speed control ring 36 to the left of the zero speed and into the reverse speed position.

Since pump 60 is, preferably driven from motor 19 it may occur that if the motor 19 is stopped while speed controller pointer 86 is in a speed productive position the speed control piston 46 and ring 36 will remain in a speed productive position for the next starting of motor 19, even if the control pointer 86 is set to zero speed before starting, for lack of sufficient fluid to shift the piston and ring before the motor starts to drive pressure pump 60. In such event the mandrel 14 and paper web 13 might start abruptly at a speed sufficient to damage the machine or tear the web of material 13. In any event it is preferable for smooth starting, to insure that the pointer 86 is positioned in zero speed position at the time that motor 19 is started.

To prevent stopping or starting of motor 19 except in the zero speed position of the rate changer 20, whereby to provide smooth starting, and prevent possibility of damage as previously explained, the motor controls are interlocked with the controller for the rate changer as follows: Referring to the diagram Fig. 6, current is supplied to motor 19 through a main switch generally denoted by the numeral 100, in which the contacts 101, 102 are urged toward a position opening the motor circuit by a spring 103, which may be overcome to close switch 100 by a solenoid 104, but only when the solenoid circuit is closed through a switch 105. Switch 105 is continuously urged toward open position by a spring 106. But, except in the zero speed position of shaft 82, a plunger 107 which is connected for movement with the movable contact member 105a of switch 105, rides on the outer periphery of a member 108 which is fixed for rotation with shaft 82, to close the switch 105, whereby to energize solenoid 104 and position switch 100 for completing the motor circuit. In the zero speed position of shaft 82 and member 108 the plunger 107 moves into a notch or groove 109, thereby permitting switch 105 to open and opening the main switch 100 to stop the motor.

In the normal operation of speed control pointer 86, with the construction just described, as for instance in forward speed adjustments of the rate changer 20, or in changing from forward to reverse speeds, the plunger 107 is either continuously in the position closing the motor switch 100, or remains in the position opening switch 100 for such a brief interval that the motor does not stop. However, if the pointer is brought to zero position and allowed to remain there the motor will stop, but only after an interval sufficient for the rate changer controls to operate to shift the rate changer to zero speed position.

An alternative method of preventing starting or stopping of motor 19 except in the zero speed adjustment of rate changer 20 is shown in the diagram, Fig. 7. Here the motor circuit is also opened and closed by a solenoid controlled switch in which the contacts 111, 112 are urged toward a position opening the motor circuit by a spring 113, which may be overcome to close switch 110 by a solenoid 114. The circuit of solenoid 114 may be temporarily closed to start motor 19 by the means of a switch 115, normally held open by a spring 116, but which may be closed by a push button 117, provided that the control shaft 82 is in zero speed position, at which time a plunger 118, movable with the movable contact 119 of switch 115, may enter a bore or recess 118a in the periphery of a member 120 fixed on control shaft 82. Unless shaft 82 is in zero speed position the plunger 118 strikes the periphery of the member 120 and the starting switch 115 cannot close. After switch 115 is closed the solenoid 114 closes a switch 121, simultaneously with the closing of motor switch 110, thus completing the solenoid circuit through switch 121 and a switch 122 which is normally held closed by a spring 123. Switch 115 may then be released and the motor will continue to run. To stop the motor the switch 123 may be opened by a push button 124, provided that the control shaft 82 and member 120 are in zero speed position, at which time a plunger 125 movable with the movable contact 126 of switch 122 may enter a bore or recess 125a in the periphery of member 120, the plunger contacting the periphery of member 120 at other times. By this means also, therefore, the motor is prevented from being started or stopped except in zero speed position of pointer 86 and shaft 82, whereby to prevent the undesirable effects previously mentioned.

What is claimed is:

1. In a transmission and control mechanism the combination of a driving motor, a rate changer driven from said motor and including rate change elements relatively shiftable to effect a substantially zero output speed irrespective of the speed of said motor, control means for shifting said elements, control mechanism for alternatively starting or stopping said motor, and means interconnecting said control means and control mechanism including an interlock preventing starting of said motor except when said control means is in the position effecting said substantially zero output speed.

2. In a transmission and control mechanism the combination of a driving motor, a rate changer driven from said motor and including rate change elements relatively shiftable to effect a substantially zero output speed irrespective of the speed of said motor, control means for shifting said elements, control mechanism for alternatively starting or stopping said motor, and means interconnecting said control means and control mechanism including an interlock preventing stopping of said motor except when said control means is in the position effecting said substantially zero output speed.

3. In a transmission and control mechanism the combination of a driving motor, a rate changer driven from said motor and including rate change elements relatively shiftable to effect a substantially zero output speed irrespective of the speed of said motor, a controller for shifting said elements, control mechanism for said motor including a device having alternative run and stop positions, and means connecting said device for movement from said controller.

4. In a transmission and control mechanism the combination of a rate changer including two frictionally engaged elements relatively adjustable for rate change effect, said elements having spaced positions respectively effecting a low speed and a relatively high speed and being adjustable to any speed position intermediate therebetween, a power operable shifter for the relative shifting of said elements, a power source connectible with said shifter, a manually adjustable controller including relatively adjustable chart and indicator means, and means controlling the connection of said power source and shifter in accordance with the relative position of said chart and indicator means.

5. In a transmission and control mechanism the combination of a rate changer including two frictionally engaged elements relatively adjustable for rate change effect, said elements having spaced positions respectively effecting a low speed and a relatively high speed and being adjustable to any speed position intermediate therebetween, a fluid operable piston device connected for the relative shifting of said elements, a fluid pressure source connectible for operation of said shifter, adjustable valve means controlling the connection of said source and shifter, and a manually operable controller for positioning said valve means including chart and indicator means having various positions respectively corresponding to the different speed positions of said elements, said valve means and piston device being operative in any position of said controller to effect the corresponding speed position of said elements.

6. In a transmission and control mechanism the combination of a rate changer including two frictionally engaged elements relatively adjustable for rate change effect, said elements having spaced positions respectively effecting a low speed and a relatively high speed and being adjustable to any speed position intermediate therebetween, a piston device for the relative shifting of said elements including a cylinder and a piston movable in either direction relative thereto, a fluid pressure source simultaneously connectible to apply pressure to both sides of said piston whereby to rigidly maintain said elements in a given rate position, drain channel means, valve means shiftable to connect either end of said piston to said drain channel means, a controller including chart and indicator means, and means for shifting said valve means to effect a drain channel connection of the one end or the other of said piston in accordance with the relative movement of said chart and indicator means, the drain channel connection thereby effected being such as to shift said piston and element in a direction to effect a rate of said rate changer corresponding to the position of said chart and indicator.

7. In a transmission and control mechanism the combination of a stepless rate changer including elements relatively adjustable for rate change effect, said elements having positions respectively effecting a low speed and a relatively high speed and being adjustable to any speed position intermediate therebetween, a piston device for adjusting said elements including a cylinder and a piston movable in either direction relative thereto, a fluid pressure source simultaneously connectible to apply pressure to both sides of said piston whereby to rigidly maintain said element in a given rate position, a member,
a train connecting said member to be actuated by said rate changer, drain channel means, valve means including a plurality of valve members each adjustable relative to the other to connect either end of said piston to said drain channel means, a speed controller including relatively adjustable chart and indicator means, a connection for shifting one of said valve members in accordance with the adjustment of said chart and indicator means, a part movable in accordance with variations in speed of said member, and a connection from said part for the movement of the other of said valve members.

8. In a transmission and control mechanism the combination of a rotatable mandrel adapted to carry superimposed layers of material at progressively differnt diameters, a device including a member shiftable to a variety of positions in accordance with the peripheral speed of the exterior layer of material exposed on said mandrel, a rate changer connected for driving said mandrel including a pair of frictionally engaged elements relatively adjustable to speed positions effecting a slow speed of said mandrel, a relatively high speed thereof and to any speed position intermediate therebetween, a controller for said rate changer including relatively adjustable chart and indicator means, a power operable shifter for said elements, a power source, and means connecting said source and shifter to effect various positions of said elements in part in accordance with the position of said member and in part in accordance with the position of adjustment of said chart and indicator means.

9. In a transmission and control mechanism for traversing a web of material selectively at different speeds, the combination of a member shiftable to a variety of positions in accordance with the linear speed of said material, a rate changer connected for traversing said material and including frictionally engaged elements relatively adjustable to various speed positions effecting a relatively low speed, a relatively high speed and any intermediate speed, a power operable shifter for said elements, a power source, a manually adjustable controller, and means connecting said power source and shifter to effect various of said element speed positions in part in accordance with the position of said member and in part in accordance with the adjustment of said controller.

10. In a web traversing mechanism the combination of a rotatable mandrel adapted to carry superimposed layers of web material at different diameters, a drive mechanism for said mandrel including a rate changer adjustable to rotate said mandrel at a high speed, a relatively low speed and substantially any intermediate speed, a power operable shifter for adjustment of said rate changer, a power source, a first control member manually adjustable for selectively determining a preferred peripheral speed of the outer layer of material on said mandrel, a second control member adjustable to various positions in accordance with the actual peripheral speed of said outer layer of material, and means connecting said power source and shifter to effect various positions of adjustment of said rate changer in part in accordance with the position of said first control member and in part in accordance with the position of said second control member.

11. In a transmission and control mechanism the combination of a motor and a rate changer driven therefrom, said rate changer including elements shiftable to selectively effect various speed positions thereof, a controller shiftable for shifting said elements, a shiftable controller for said motor, and means interconnecting said controllers including means limiting the operation of one of said controllers in accordance with the position of the other controller.

12. In a transmission and control mechanism the combination of a motor and a rate changer driven therefrom, said rate changer including elements relatively shiftable to selectively effect various speed positions thereof, a controller shiftable for shifting said elements, a shiftable motor controller, and interlock means preventing operation of one of said controllers except during a preferred position of the other controller.

13. In a transmission and control mechanism the combination of a rate changer including a rotatable carrier, a plurality of rollers each having a conical friction surface and each supported from said carrier for bodily rotation therewith on the carrier axis and relative to the carrier on an axis inclined with respect to the carrier axis, a reaction member adjustable relative to said carrier in the direction of the carrier axis through a range corresponding to the rate change effect of said rate changer, said reaction member having a friction ring surface co-axial with the carrier and effecting pressure engagement with the conical friction surface of said rollers in various positions of said adjustment of the reaction member, a power operable shifter for said adjustment of the reaction member, a power source connectible with said shifter, a manually adjustable controller including relatively movable chart and indicator means, and means controlling the connection of said power source and shifter in accordance with the relative position of said chart and indicator means.

14. In a trnasmission and control mechanism the combination of a rate changer including a rotatable carrier, a plurality of rollers each having a conical friction surface and each supported from said carrier for bodily rotation therewith on the carrier axis and relative to the carrier on an axis inclined with respect to the carrier axis, a reaction member adjustable relative to said carrier in the direction of the carrier axis through a range corresponding to the rate change effect of said rate changer, said reaction member having a friction ring surface co-axial with the carrier and effecting pressure engagement with the conical friction surface of said rollers in various positions of said adjustment of the reaction member, a fluid operable piston device connected for said adjustment of the reaction member, a fluid pressure source connectible for operation of said piston device, adjustable valve means controlling the connection of said source and device, and a manually operable controller for positioning said valve means including chart and indicator means having various positions respectively corresponding to the different positions of said reaction member adjustment.

15. In a transmission and control mechanism the combination of a rate changer including a rotatable carrier, a plurality of rollers each having a conical friction surface and each supported from said carrier for bodily rotation therewith on the carrier axis and relative to the carrier on an axis inclined with respect to the carrier axis, a reaction member adjustable relative to said carrier in the direction of the carrier axis through a range corresponding to the rate change effect of said rate changer, said reaction member having a friction ring surface co-axial with the carrier and effecting pressure engagement with the conical friction surface of said rollers in various positions of the adjustment of said reaction member, a power operable shifter for the adjustment of said reaction member, a power source connectible for operation of said shifter, a speed responsive device driven from said rate changer including an element having different speed positions, a manually adjustable chart and indicator mechanism, and means controlling the connection of said power source and shifter in part in accordance with the position of said element and in part in accordance with the adjustment of said chart and indicator mechanism.

16. In a transmission and control mechanism the combination of a rate changer including a rotatable carrier, a plurality of rollers each having a conical friction surface and each supported from said carrier for bodily rotation therewith on the carrier axis and relative to the carrier on an axis inclined with respect to the carrier axis, a reaction member adjustable relative to said carrier in the direction of the carrier axis through a range corresponding to the rate change effect of said rate changer, said reaction member having a friction ring surface co-axial with the carrier and effecting pressure engagement with the conical friction surface of said rollers in various positions of said adjustment of the reaction member, a power operable shifter for the adjustment of said reaction member, a power source, a speed responsive device driven from said rate changer including an element having different speed positions, and means controlling the connection of said power source and shifter in accordance with movement of said element.

FRED A. PARSONS.